United States Patent [19]

Gabbrielli

[11] 4,094,425

[45] June 13, 1978

[54] DEVICE AND A METHOD FOR HANDLING MATERIAL

[76] Inventor: Franco Gabbrielli, Via Reginaldo Giuliani, 126, 50141-Firenze, Italy

[21] Appl. No.: 749,265

[22] Filed: Dec. 10, 1976

[30] Foreign Application Priority Data

Dec. 24, 1975 Italy .................................. 9663 A/75

[51] Int. Cl.² ............................................. B65G 65/04
[52] U.S. Cl. ................................ 214/310; 214/16.4 R; 214/95 R; 214/152
[58] Field of Search .................... 214/16.4 R, 89, 152, 214/310, 95 R; 198/782

[56] References Cited

U.S. PATENT DOCUMENTS 3,010,589  11/1961  Davis ........................... 214/16.4 R X
3,921,840  11/1975  Julien et al. ......................... 214/310

*Primary Examiner*—Robert G. Sheridan
*Attorney, Agent, or Firm*—Cushman, Darby & Cushman

[57] ABSTRACT

A material handling device comprises a roller conveyor component having rollers which are separated by gaps; a cage component which includes rows of uprights, the spacing and the thickness of the uprights in each row being such as to permit their insertion into said gaps and their movement through the gaps; crosspieces interconnecting the uprights of one row only with corresponding uprights of other rows, the crosspieces extending parallel to the axes of the rollers and being insertable in the gaps; a motor for effecting relative movement between the cage and the conveyor perpendicularly to each other such that the uprights and the crosspieces can move through the gaps.

11 Claims, 9 Drawing Figures

DEVICE AND A METHOD FOR HANDLING MATERIAL

The uprights are fastened by one of their ends to a frame. A cage component so formed can be inserted with its uprights nd crosspieces freely through the gaps of the conveyor component of the device and moved vertically relatively to it till its frame abuts against the conveyor rollers and can be removed from the conveyor, for instance to be replaced by a spare cage component.

Articles may be supported in the cage by placing groups of each article over two or more crosspieces of the same order. In this way, a cage can be loaded with as many groups of articles as it has orders of crosspieces, from the lowermost to the uppermost order.

To transfer the contents of a so filled case to another machine, for instance to another conveyor, the case is lowered through the gaps of the roller conveyor component till its rollers lift the articles from the crosspieces, whereafter the rollers are revolved in the sense in which they convey the articles towards the other machine. Once the lowermost crosspiece order has been emptied, the cage component is lowered till the second lowest group of articles is lifted from its supporting crosspieces, and so forth, till all groups are discharged. Viceversa, if the introduction of articles starts from the uppermost order of crosspieces, which must be lowered beneath the conveyor rollers, which revolve in the sense to shift the articles into the cage. Thereafter the cage is raised whereby the articles are lifted from the rollers and remain supported by said uppermost crosspiece order. This operation is thereafter repeated to introduce the article groups into the successive orders. Once such a cage component has been filled or emptied, it can be lifted till its uprights are raised clear of the conveyor gaps and be replaced in succession by other cage components. Of course, the device of the invention permits also to receive or discharge groups of articles at different levels, by rendering the conveyor vertically movable relatively to the cage component.

The device may be used for moving from one processing station to another and store for further handling articles of practically any shape and size, up to a maximum, which covers a whole order of crosspieces. The vertical distance between the crosspiece orders can be made adjustable by any known means, if the cages are to handle goods of varying height.

The device proves particularly useful when inserted between processing stations of different production speeds, for instance to absorb the excess production of the quicker operating station upstream of it and store it, to feed it into the successive, slower operating station downstream during the downtime of the quicker station. The transfer of the cage components from the device into a storage space and back can be easily automated by any known and therefore not described nor claimed means.

To better illustrate the invention and its flexibility, one of its possible embodiments will now be described, for an illustrative and in no way limitative purpose, with reference to the attached drawings.

Figure 9:
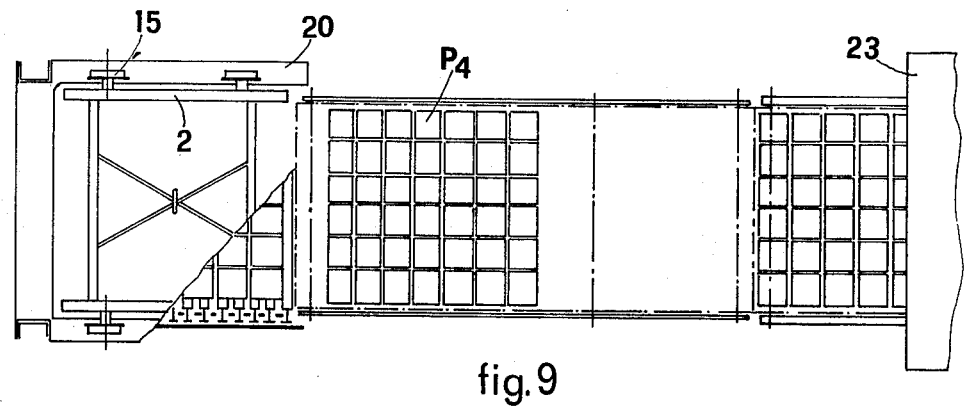

FIG. 9 a top view of the embodiment as used in connection with a tunnel kiln of a ceramic tile factory.

Figure 6:
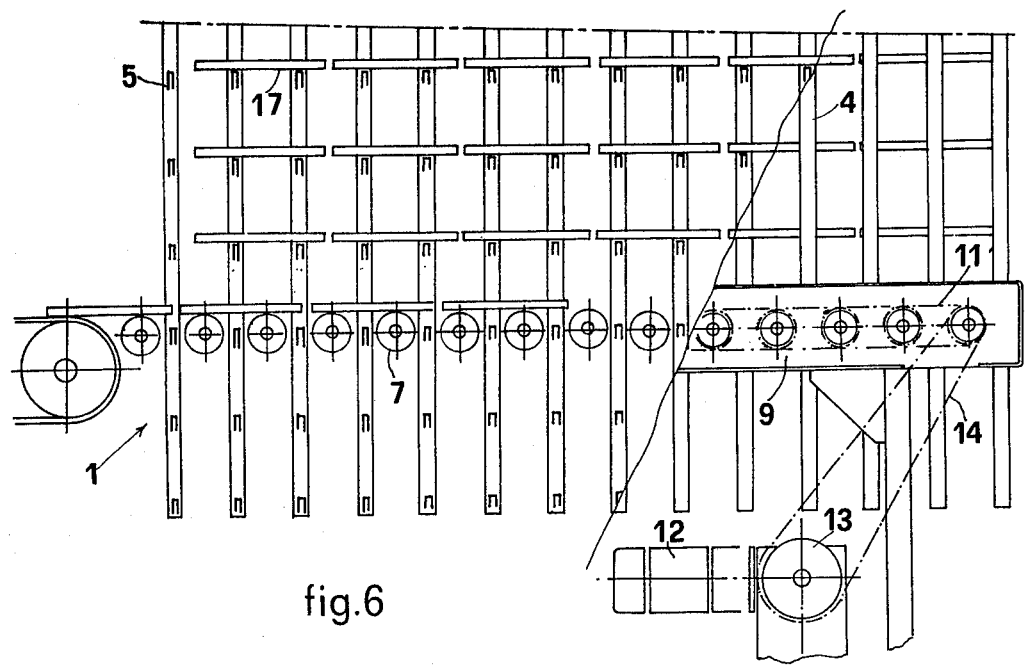
FIG. 6 is a lateral elevational, partly sectional view of the embodiment, showing the cage component and the conveyor component in a stage of their coaction.
Figure 8:
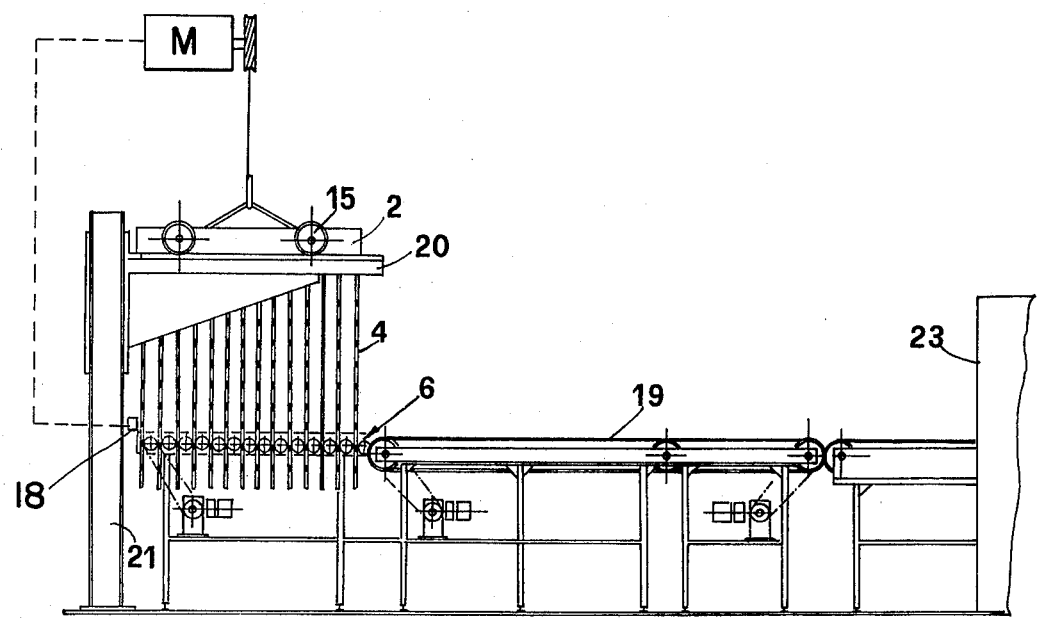
FIG. 8 is a lateral elevational view.

The cage component is generally indicated at 1. Its frame comprises two parallel horizontal beams 2 inerconnected by two crossbars 3. From each beam there depends downward a row of vertically extending uprights 4. Thus, this embodiment possesses only two rows of uprights, the distance $d$ between adjacent beams of each row being larger than the diameter of the rollers 7 of the conveyor component 6 of the device, to permit the upright to pass through the gaps between said rollers, as shown in FIGS. 6 and 8.

Figures 1, 2:
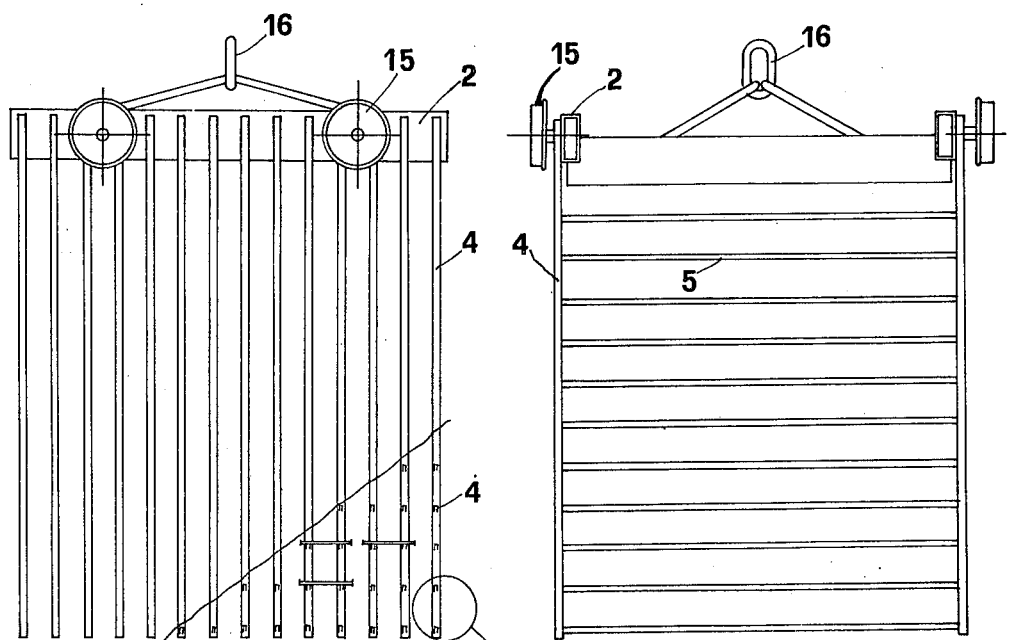
FIG. 1 is a lateral elevational view of the cage component of the embodiment, with its lower left portion broken away.
FIG. 2 is a front view.
Figure 3:
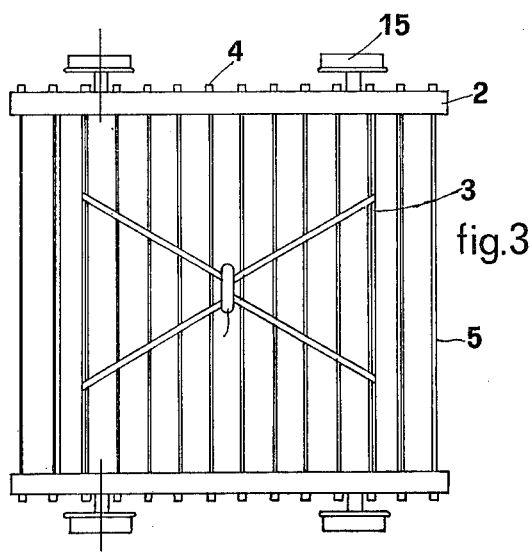
FIG. 3 is a top view of the cage component.
Figure 4:
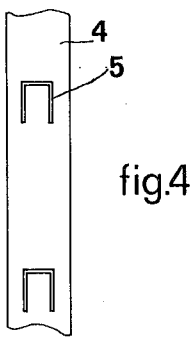
FIG. 4 is an enlarged view of the encircled portion of FIG. 1.
Figure 5:
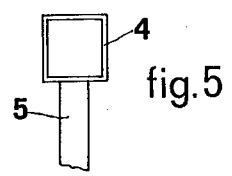
FIG. 5 is a cross-sectional view of FIG. 4.

Each upright 4 of one row is connected with its opposite upright on the other row by the already stated array of crosspieces 5. As shown in the broken away portion of FIG. 1 and in FIGS. 6 and 7, tiles are supported by the crosspieces, said tiles straddle two crosspieces in FIG. 1 and over three crosspieces in FIGS. 6 and 7.

Figure 7:
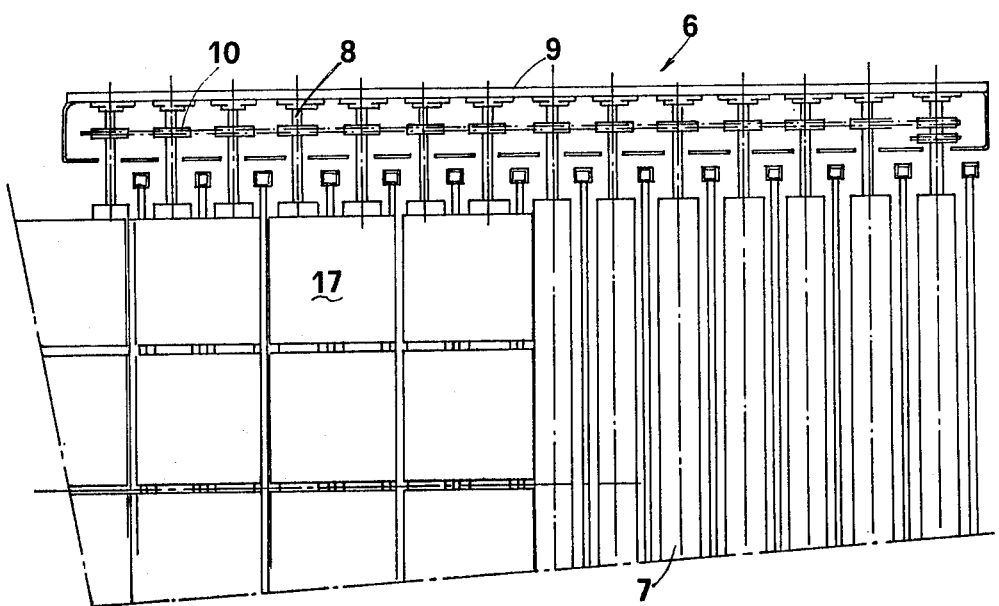
FIG. 7 is a top view of FIG. 6.

As shown in FIG. 7, the roller shafts 8 are rotatably supported in bearings provided in the conveyor frame 9 and fitted with sprockets 10, all sprockets being driven over a common chain 11 from a terminal sprocket, which can be rotated in both directions, through a transmission chain 14, by a motor 12 and a reduction gear 13.

In this embodiment, the frame formed by the beams 2 and the crossbars 3 is located at the top of the cage component and is fitted with wheels 15; by which said cage 1 can be transferred elsewhere, as by (not shown) overhead rails. Of course, said frame could also be located at the lower end of the cage in lieu of at the top of it, should it be found impractical to use overhead rails in the plant using it.

In the specific embodiment shown, a shackle 16 is attached to the crossbars 19 to hook the cage component to the equipment used for its transfer over or away from the conveyor component.

FIG. 6 can be interpreted as showing either a loading or an unloading operation of tiles 17. If the belt conveyor 19 and the rollers 7 are considered as rotating clockwise, the tiles 17 are shown as being transferred from the belt conveyor to the roller conveyor, with the three upper crosspiece orders being already filled and the cage being lifted by a motor M (FIG. 8) as soon as the first row of the group of tiles has reached the last crosspiece of the fourth row. A suitably located sensor 18 may be provided, to stop both the rollers and the belt conveyor and to lift the fifth order of crosspieces into the gaps of the roller conveyor 6.

If both the belt conveyor and the rollers 7 are considered rotating anticlockwise, then FIG. 6 represents a cage unloading operation, with the two lowermost orders being emptied and the rollers transferring the tiles from the third lowest order to the belt conveyor. It is obvious that if the rollers and the belt conveyor or other transfer mechanisms rotate at the same peripheral speed, the arrangement of the group of tiles will not be altered during these transfers.

All transfer operations, as well as the stepwise lifting or lowering operations, can be rendered completely automatic by any known means. These means do not form part of the invention, are within the reach of the average expert in the art and are therefore neither described, illustrated nor claimed.

Modern tile factories use monolayer tunnel kilns. The ceramic materials to be fired pass through them over rollers located in the kiln. It is antieconomical to let the kiln go out, and therefore such kilns are kept at their operating temperature night and day, during workdays and holidays, and therefore during the downtime or standstill of the other factory equipment. The other main equipment, such as the tile forming station and the glazing station upstream of the kiln, and the tile sorting and packaging stations downstream of the kiln have a much greater capacity than the kiln. To keep the kiln constantly operating, that is to say always fed with tiles, even during any downtime of the other equipment, and to absorb temporarily any axcess production upstream of the kiln or the output from the kiln during the downtime of the processing stations downstream of the kiln, it is sufficient to insert four devices according to the invention into the production line. A first device is inserted after the glazing station to receive the formed and glazed tiles. The cages filled with the tiles are parked and transferred, once the kiln is ready to receive said tiles, to a second device placed before the kiln entrance, to introduce the tiles from the filled cases into the kiln. The emptied cases are parked before the first device for further use. The fired tiles issuing from the kiln are introduced into the cage components inserted, in succession, in the conveyor component of a third device installed before the kiln exit and the cages filled with the fired tiles are parked and inserted into a fourth device installed before the first processing station of the fired tiles, for instance the tile sorting station, into which they are transferred from the cages once work on it is resumed. The emptied cages from the fourth device are also parked, ready for their reuse in the first one.

All the operations can be completely automated. Since, as stated, the tile forming and glazing stations have a much greater production capacity than the kiln, sufficient material is accumulated during workdays in the cages to keep the kiln producing during holidays. FIGS. 7 and 8 are schematic views of the device showing the groupwise transfer of tiles into a kiln. The four wheels 15 of cage 1 rest on brackets 20 which are slidable on guide posts 21. Not shown means are provided to impart to the brackets an intermittent vertical motion to insert the crosspiece orders in succession into the gaps of the roller conveyor 6. The tiles are transferred in groups P4 in the direction of arrows F to a belt conveyor and hence to the entrance of an only partially shown tunnel kiln 23.

It is obvious that many changes may be applied to the above illustrated embodiment without departing from the idea of the invention. Thus, the open construction of the cage component and the gap provided between the rollers of the conveyor component permit to disinsert one from another in a vertical direction, but also by a lateral displacement of one component relatively to the other. Similarly the cage may be made such, that its crosspieces are removable and/or vertically displaceable, so as to adapt the vertical distance between the orders to the dimensions of the articles being handled by the device. These and other changes and variations are obvious and are therefore to be considered as falling within the scope of the invention.

What is claimed is:

1. A material handling device comprising a roller conveyor component having rollers which are separated by gaps; a cage component which includes rows of uprights, the spacing and the thickness of the uprights in each row being such as to permit their insertion into said gaps and their movement through said gaps; crosspieces interconnecting the uprights of one row only with corresponding uprights of other rows, said crosspieces extending parallel to the axes of said rollers and being insertable in said gaps means for effecting relative movement between said cage and said conveyor perpendicularly to each other such that said uprights and said crosspieces can move through said gaps.

2. A material handling device according to claim 1, wherein said crosspieces extending between corresponding uprights form an array, each crosspice of one array having corresponding crosspieces in other arrays lying at the same level with it.

3. A material handling device according to claim 2, wherein each crosspiece of one array has corresponding crosspieces in all other arrays lying at the same level with it to form an order of crosspieces, each order constituting a support for a group of articles.

4. A material handling device according to claim 1, wherein the cage component comprises a frame, said uprights being fastened by one end to said frame.

5. A material handling device according to claim 4, wherein said frame includes two parallel interconnected, spaced apart beams, the uprights being fastened to each beam by one end thereby forming two parallel rows of uprights and the crosspieces thereby forming supports of a width equalling the distance between said two rows.

6. A material handling device according to claim 4, wherein said frame is provided with wheels.

7. A material handling device according to claim 1, wherein the means for effecting relative movement between said cage and said conveyor includes sensor means to interrupt said relative movement each time one order of crosspieces reaches the level of said gaps of said conveyor.

8. Apparatus for handling articles comprising a roller conveyor component having rollers which are separated by gaps; a cage component including a plurality of rows of uprights, the rows extending in the direction of said conveyor component and the spacing and thickness of the uprights in each row being such as to permit said uprights to move into and through said gaps; means for effecting relative movement between said uprights and said roller conveyor component in a direction perpendicular to the axes of the rollers so that said uprights can be moved through said gaps; nd article-supporting means carried by said uprights for receiving articles from or depositing articles on said rollers when said relative movement is effected, said shape, dimensions and arrangement of said article-supporting means allowing the latter to pass through said gaps and said article supporting-means being arranged in arrays one above another such that each array is capable of receiving or depositing a respective group of articles.

9. A method of removing articles from or depositing articles on a roller conveyor having rollers which are spaced apart by gaps, said method comprising inserting into each of a plurality of adjacent gaps at least two uprights which are spaced apart along the length of the respective gap, said at least two uprights carrying article-supporting means; and effecting relative movement between said conveyor and all said uprights and article supporting-means in a direction perpendicular to the axes of the rollers so as to effect movement of the uprights and article-supporting means through the gaps whereby articles will be lifted from the rollers or deposited on the rollers depending on the direction of said relative movement.

10. A method as in claim 9 wherein said movement is effected in a mode to deposit the articles on the rollers and wherein said rollers are thereafter rotated so as to transfer the articles away from the uprights.

11. A method as in claim 9 wherein said movement is effected in a mode to deposit the articles on the rollers.

* * * * *

UNITED STATES PATENT OFFICE
CERTIFICATE OF CORRECTION

Patent No. 4,094,425              Dated  June 13, 1978

Inventor(s) Franco Gabbrielli

It is certified that error appears in the above-identified patent and that said Letters Patent are hereby corrected as shown below:

Column 1, before line 1, insert the following paragraph:

--The invention refers to the field of material handling devices, and more specifically to a device which is capable of automatically receiving, storing and again discharging in succession groups of articles without disarraying the arrangement in which they have been received. Its essential constituents or components are a roller conveyor, whose rollers are spaced apart from each other, so as to leave a gap between them, and a cage. Said cage consists of two or more parallel rows of vertical uprights, the uprights of each row being spaced apart and having a thickness such as to pass through the gaps of the roller conveyor or, viceversa, to permit the rollers of the conveyor to pass between said upright. The upright of each row lies with the corresponding uprights of the other rows in a plane parallel to the axes of the conveyor rollers and is connected with them, at various levels, by crosspieces which form in this manner a vertical array of crosspieces. For the sake of brevity we shall term the crosspieces of all arrays which lie at the same level an order of crosspieces.--

UNITED STATES PATENT OFFICE

CERTIFICATE OF CORRECTION

Patent No. 4,094,425  Dated June 13, 1978

Inventor(s) Franco Gabbrielli

It is certified that error appears in the above-identified patent and that said Letters Patent are hereby corrected as shown below:

Column 1, Line 6, "nd" should read --and--.

Column 3, line 18, "axcess" should read --excess--.

Claim 1, line 10, after "gaps" insert -- ; --.

Claim 8, line 52, "nd" should read --and--.

Signed and Sealed this

Twelfth Day of June 1979

[SEAL]

Attest:

RUTH C. MASON
Attesting Officer

DONALD W. BANNER
Commissioner of Patents and Trademarks